United States Patent Office 2,941,918
Patented June 21, 1960

2,941,918

NOVEL POLYMERIC PRODUCTS AND PROCESS

Charles P. West, Metuchen, N.J., and Leonard Feiler, Brooklyn, N.Y., assignors to Curtiss-Wright Corporation, a corporation of Delaware No Drawing. Filed June 12, 1957, Ser. No. 665,135

12 Claims. (Cl. 154—140)

This invention relates to novel modified phenolic-aldehyde copolymer resins having excellent strength characteristics, particularly at elevated temperatures. More particularly, the invention relates to phenolic-aldehyde copolymer resins containing as a modifying agent, zirconium, which imparts high temperature strength to the copolymer resins and to laminates produced from the copolymer resins of the invention.

Phenolic-aldehyde resins, exemplified by phenol-formaldehyde copolymers, have been known and marketed for a number of years and are suitable for many purposes. In spite of their general acceptability, these polymers do not have the strength characteristics at elevated temperatures, i.e., at temperatures in the order of 500–600° F., to make them suitable for many applications which must be subjected to high temperatures during use. In the course of a research investigation resulting in the present invention, we have discovered that phenolic-aldehyde copolymers, such as a phenol-formaldehyde resole or "A"-stage resins, can be modified readily to produce a resin which is thermosetting and which has excellent strength characteristics, particularly at elevated temperatures of the order of 500–600° F. It is possible to produce glass-fabric reinforced laminates from the resins of the invention which at 600° F. have a flexural modulus of rupture of about 86,500 lbs./sq. in. and a modulus of elasticity of about $5.2 \times 10^6$ lbs./sq. in. when determined by A.S.T.M. test D790–49T. The high strength characteristics at elevated temperatures of these laminates produced in accordance with the present invention make them suitable for use as compressor blades for turbo-prop or gas-turbine aircraft engines.

It is an object of the present invention to provide modified phenolic resin compositions and reinforced laminates thereof which possess excellent strength characteristics, particularly at elevated temperatures.

It is also an object of the present invention to provide modified phenolic resin compositions from which reinforced laminates may be produced which are suitable for use as compressor blades for turbo-prop or gas-turbine aircraft engines.

It is a further object to provide a method for modifying resole or "A"-stage phenolic-aldehyde resins to provide thermosetting resins having improved strength characteristics over those of thermosetting resins produced from the unmodified resins.

Other additional objects will be apparent to those skilled in the art from reading this specification.

In accordance with the present invention a resole or "A"-stage phenol-aldehyde resin may be modified by mixing therewith a small quantity of a zirconium lower alkoxide, such as zirconium butoxide, desirably in the presence of a di- or polyfunctional chelating agent which inhibits the reaction of the zirconium lower alkoxide with the phenol-aldehyde resole resin until curing of the modified copolymer resin is undertaken. The polyfunctional chelating agent prevents premature gelation of the composition and extends its pot-life until curing can be undertaken conveniently. The zirconium lower alkoxide appears to react with the phenol-aldehyde resole resin at the sites of free hydroxyl groups, splitting out the alcohol of the alkoxide, with the zirconium producing a more highly crosslinked three dimensional rigid structure through linkage of the zirconium atoms with the oxygen atoms of the former free hydroxyl groups. Regardless of the accuracy of this theory, to which theory we do not propose to be bound, zirconium metal becomes chemically bound to the thermosetting resin which forms on curing and a stronger, more heat resistant product is obtained. The alcohol formed during the polymerization reaction volatilizes from the resinous composition during the curing cycle.

The resole or "A"-stage phenol-aldehyde resins employed as the starting materials are well known products, with which the resin chemist is familiar. They are produced by condensing a phenol with a molecular excess of an aldehyde in the presence of an alkaline catalyst, wherein the polymerization reaction is terminated in its early stages. The product is water soluble and fusible. One desirable resole resin is produced by polymerizing about 1.2 to 1.4 moles of formaldehyde for each mole of phenol. A typical resole resin has been found to contain about 3 aromatic nuclei in each molecule and to have a molecular weight in the order of about 350. This early stage resin is to be distinguished from the thermoplastic novolac resins which are permanently water-soluble and fusible and which are produced by employing a molecular excess of phenol component using an acid catalyst. It is also to be distinguished from the more advanced stage resitol or "B"-stage resins which are more highly polymerized and which are insoluble in alkali but partly or completely soluble in acetone. It is, of course, distinguished from the resite or the "C"-stage resins which are fully cured, insoluble and infusible polymers.

The phenol component of the resole resin employed as a starting material may be any mononuclear mono- or polyhydric phenol, such as phloroglucinol, resorcinol, orcinol, meta-cresol and, of course, phenol per se. The phenol component should be unsubstituted in the position para and at least one position ortho to a hydroxyl group, otherwise it is impossible to produce a crosslinked, thermosetting resin upon curing. Preferably, the phenol component shall contain an average of at least 2.2 unsubstituted reactive sites, i.e., unsubstituted carbon atoms ortho and para in the nucleus. Thus ortho-cresol, which has one ortho and a para position unsubstituted has 2 reactive sites. Phenol per se has two ortho positions and a para position unsubstituted for 3 reactive sites. Ortho-cresol and phenol may be employed as a mixture in such proportions that the mixed phenols have an average of at least 2.2 unsubstituted reactive sites.

The aldehyde component of the resole resin may be any aliphatic or aromatic aldehyde containing up to 6 carbon atoms, such as furfurylaldehyde, propionaldehyde, acetaldehyde and formaldehyde. However, it is preferred to employ a lower aliphatic aldehyde containing not more than 2 carbon atoms. Formaldehyde is preferred. It is desirable to employ the lower aliphatic aldehydes, for the higher the molecular weight of the aldehyde, the less heat resistant is the final zirconium-modified cured resin of the invention. Formaldehyde may be employed in any of the commercial forms in which it is available. Thus, the aqueous solution, sold under the name formalin, which contains 37% by weight of formaldehyde in water with about 1 to 15% methanol added to prevent polymerization of the formaldehyde during storage, has been found to be very satisfactory for this purpose. Other aqueous solutions of formaldehyde containing various percentages of formaldehyde, such as 30 to 60% by weight, may also be employed.

The zirconium alkoxide is employed in the form of a zirconium tetra-lower-alkoxide, with each alkoxide group containing up to 6 carbon atoms and preferably not more than 4 carbon atoms. The zirconium tetraalkoxide should be relatively free from chlorides. Lower molecular weight alkoxides are preferred since the alcohols produced during curing are more volatile and more readily evaporated from the resinous composition. With lower zirconium tetraalkoxides, the reaction with phenol-aldehyde resole resin is more rapid and consequently with these alkoxides it is necessary to employ larger quantities of polyfunctional chelating agent to retard the gelation of the composition prior to the curing cycle. Zirconium tetrabutoxide has been found to be very satisfactory. Other zirconium tetraalkoxides which may be employed are zirconium tetramethoxide, zirconium tetraethoxide, zirconium tetrapropoxide, zirconium tetrapentoxide, and zirconium tetrahexoxide. As those skilled in the art will appreciate, the alkoxide groups of the zirconium tetraalkoxide may be varied, as for example in the case of zirconium dibutoxide, dimethoxide.

The difunctional or polyfunctional chelating agent may be any compound having two or more functional groupings which will chelate or form a loose or coordinate type linkage with the zirconium tetraalkoxide. Preferably, the polyfunctional chelating agent possesses a boiling point which is low enough to volatilize during the curing cycle of the zirconium-modified phenolic resin. Advantageously the boiling point will be less than 350° F. The polyfunctional chelating agent, by virtue of its coordinate or loose linkage with the zirconium tetraalkoxide, inhibits the reactivity of the zirconium alkoxide with the resole phenolic resin. This prevents premature gelation of the resole resin composition and extends the pot-life of the composition so that it may be conveniently stored for sufficient periods of time until lamination procedures can be completed and the curing cycle initiated. The exact nature of the temporary linkage with the zirconium alkoxide is not known. During the curing cycle, the polyfunctional chelating agent is volatilized and driven from the resinous composition. The functional groupings of the chelating agent may be of many types, such as the amino, hydroxyl, carboxylic, nitro or keto groups. One chelating agent which we have found to be excellent for our purpose is 2,4-pentanedione (acetylacetone). Another suitable chelating agent is acetoacetic ester (ethylacetoacetate). Other suitable polyfunctional chelating agents are the diamines, such as ethylenediamine or propylenediamine, etc.; an amino alcohol, such as 1-amino-2-ethanol or 1-amino-2-hydroxypropane, etc.; a dicarboxylic acid, such as oxalic acid or malonic acid, etc. Acetylacetone is preferred.

In producing the zirconium-modified phenolic resins of the invention it is desirable to employ the zirconium tetraalkoxide in an amount of between about 5 and 15% of zirconium alkoxide solids by weight of total phenolic resin solids. Some of the advantages of the present invention may be obtained with the use of as little as 1% of zirconium alkoxide per weight of phenolic resin solids. Above 15% of zirconium alkoxide solids per weight of phenolic resin solids, the heat stability of the final resinous product begins to diminish. Optimum results with zirconium tetrabutoxide are obtained when employed in an amount of between about 9 and 11% by weight of phenolic resole resin solids.

The polyfunctional chelating agent is desirably employed in an amount of at least 0.5, and preferably at least about 0.75, mole per mole of zirconium tetraalkoxide. There is no upper limit of the amount of chelating agent which may be employed although excessive amounts of chelating agent are wasteful since the excess is normally driven off from the reaction composition during curing. With zirconium low molecular weight alkoxides it is desirable to employ larger amounts of chelating agent in order to sufficiently retard the reactivity for the resole phenolic resin.

In producing the zirconium modified resins according to the invention, we desirably first produce a solution of the resole phenolic resin in a volatile medium, such as an alcoholic aqueous medium. Desirably a small amount of hexamethylenetetramine is also added in the resulting solution to provide additional crosslinking of the resole phenolic resin to provide additional strength and rigidity. To the resulting solution of resole phenolic resin is added a mixture of a solution of a zirconium alkoxide in a volatile solvent, such as an alcohol, along with the polyfunctional chelating agent. The resulting resin may be cured by progressively increasing the temperature until the curing cycle is completed. Where it is desirable to produce a reinforced laminate, the resulting varnish produced upon mixing the solutions of phenolic resole resin, zirconium alkoxide and polyfunctional chelating agent is first painted, sprayed or otherwise impregnated into the reinforcing cloth or other web material. The reinforcing web may be made of glass fabric or filaments, metal fabric or filaments or, other materials and the plies or other forms of lamination precured until adherence of the plies results. Thereafter, the laminate is fully cured under pressure at an elevated temperature. One of the advantages of precuring the resin at a temperature less than that of the final curing temperature is to evaporate the solvent and advance the polymerization of the resin slowly without obtaining blisters or bubbles which will result if the resin is cured too rapidly. The employment of pressure in the final stages of curing of the laminate assists in reducing the formation of bubbles or voids. The temperature of curing will depend upon the time desired for completing the cured cycle. The initial precuring may begin at a temperature of about 80° F. and a temperature of about 375° F. is usually sufficient to complete the curing cycle.

In order that the present invention may be better understood, the following examples prepared according to this invention are given for the purposes of illustration.

*Example 1*

This example demonstrates the preparation of a glass fabric reinforced laminate containing a zirconium modified phenolic resin in accordance with the present invention.

About 1.8 grams of hexamethylenetetramine was dissolved in 13 grams of 95% ethanol and 1.5 grams of water and the resulting solution added to 120 grams of phenol-formaldehyde resole resin containing 64% nonvolatile matter. The phenol-formaldehyde resole resin was that marketed by the Bakelite Division of Union Carbide and Carbon Co. as an "A"-stage phenol-formaldehyde resin (Bakelite BV–17,085, known otherwise as Bakelite BLL–3085, which is a resole phenol-formaldehyde resin prepared from a molar excess of formaldehyde having a viscosity of 125–175 centipoises at 25° C., a specific gravity of 1.144–1.154, containing a mixture of water and denatured ethyl alcohol as the solvent). To the resulting mixture was added 40 grams of a 20% weight/volume solution of zirconium tetrabutoxide in butanol along with 15 grams of acetylacetone. This amount of zirconium tetrabutoxide solids was about 10% by weight of the total phenolic resin solids. The resulting mixture was a laminating varnish containing 33⅓% by weight of resin solids. Twenty-five plies of glass fabric (style 181, e.g., with each warp and fill yarn going under one and over seven yarns, otherwise referred to as a long shaft satin weave) having a coating of vinyl trichlorosilane were each dipped twice into the resulting resin varnish. The plies of impregnated glass fabric were separately dried in an air oven as a precuring treatment at 220° F. for 20 minutes. During this period most of the ethanol, butanol and water solvents had volatilized from the resinous composition. Also, some of the butanol which formed from the reaction of the zirconium tetrabutoxide with the phenolic resole resin was also volatilized along with the acetylacetone which was also liberated during the curing reaction. The plies were then laid one above the other and placed between steel plates treated with a silicone mold release compound and the resulting laminate was then fully cured in a hydraulic press for 50 minutes at 100 lbs./sq. in. pressure at a temperature of 350-375° F. The cured laminate was found to contain 34% by weight of zirconium modified phenol-formaldehyde resin and when tested according to A.S.T.M. strength test D790–49T disclosed on page 168 of the October 1955 Proceedings of the A.S.T.M. at a temperature of 600° F., the glass reinforced laminate was found to have a modulus of elasticity of $5.2 \times 10^6$ lbs./sq. in. and a flexural modulus of rupture of 86,500 lbs./sq. in.

*Example II*

This example demonstrates the preparation of a glass cloth reinforced laminate containing a zirconium modified phenolic resin in accordance with the present invention.

About 1.93 parts by weight of hexamethylenetetramine was dissolved in 60 parts by weight of methanol and the resulting solution added to 120 parts by weight of a phenol-formaldehyde resole resin containing 64% of non-volatile matter. The phenol-formaldehyde resole resin was that marketed by the Bakelite Division of Union Carbide and Carbon Co. as an "A"-stage phenol-formaldehyde resin (BV-17,085). To the resulting mixture was added 34.6 parts by weight of a 20% weight/volume solution of zirconium tetrabutoxide in butanol along with 10 parts by weight of 2,4-pentanedione (acetyl-acetone). The amount of zirconium tetrabutoxide solids was 9% by weight of the total phenolic resin solids. The resulting mixture was a resinous laminating varnish. 25 glass plies of glass cloth weave 181 bonded with Volan 114 (a methacrylato chromic chloride complex) were dipped in the resulting laminating varnish and precured in a circulating air oven for 25 minutes at 230° F. The precured plies were then laid one above the other and the resulting laminate was cured in a hydraulic press for 50 minutes at 360° F. under a pressure of 200 lbs./sq. in. The resulting cured laminate contained a resin content of 29.7%. When tested for flexural modulus of rupture and modulus of elasticity at room temperature and at 500° F. in accordance with A.S.T.M. test D790–49T, the following values were obtained:

|  | Flexural Modulus of Rupture, p.s.i. | Modulus of Elasticity, p.s.i. |
|---|---|---|
| Room Temperature | 83,000 | $4.7 \times 10^6$ |
| 500° F. (after ½ hr. at 500° F.) | 62,500 | $4.2 \times 10^6$ |

A similar laminate was produced in the same manner employing the same phenol-formaldehyde resole resin except that no zirconium alkoxide or acetylacetone was employed. When tested under the same conditions as above, the reinforced, unmodified phenol formaldehyde resin laminate was found to give the following test values:

|  | Flexural Modulus of Rupture, p.s.i. | Modulus of Elasticity, p.s.i. |
|---|---|---|
| Room Temperature | 56,000 | $3.4 \times 10^6$ |
| 500° F. (after ½ hr. at 500° F.) | 46,500 | $3.0 \times 10^6$ |

*Example III*

This example demonstrates the preparation of a glass fabric reinforced laminate containing a zirconium modified phenolic resin in accordance with the present invention, employing 0.5 mole of chelating agent for each mole of zirconium butoxide.

To about 120 parts by weight of "A"-stage phenol-formaldehyde resin (Bakelite BV–17,085) was added 1.93 parts by weight of hexamethylenetetramine dissolved in 60 parts by weight of methyl alcohol. To the resulting mixture was added a mixture of 46.1 parts by weight of a 20% weight/volume solution of zirconium tetrabutoxide in butanol and 1.2 parts by weight of acetylacetone. The resulting mixture provided a laminating varnish into which were dipped 25 plies of glass cloth (style 181, Volan A finish). The dipped glass plies were precured by heating them separately in a circulating air oven for 20 minutes at 240° F. The precured plies were removed from the oven and stacked one above the other and placed between stainless steel plates which had been treated with a silicone emulsion spray type mold release compound. The stacked plies were then cured by treating them at contact pressure for 4–5 minutes at 350° F., the pressure was released for 30 seconds, and the plies were then subjected to the same temperature of 350° F. for 15 minutes at a pressure of 100 pounds per square inch, followed by 30 minutes at 500 pounds per square inch. The resulting laminate contained 30.4% resin and had the following properties:

|  | Flexural Modulus, p.s.i. | Modulus of Elasticity, p.s.i. |
|---|---|---|
| Room temperature | 74,000 | $3.98 \times 10^6$ |
| 500° F. (after ½ hr. at 500° F.) | 59,000 | $3.54 \times 10^6$ |

*Example IV*

The procedure of Example III, above, was repeated but replacing the acetylacetone with 1.5 parts by weight of ethylenediamine. The mole ratio of ethylenediamine to zirconium butoxide was 1:1. The resulting laminate contained 31.6% resin and had the following properties:

|  | Flexural Modulus, p.s.i. | Modulus of Elasticity, p.s.i. |
|---|---|---|
| Room temperature | 69,500 | $3.8 \times 10^6$ |
| 500° F. (after ½ hr. at 500° F.) | 56,000 | $3.3 \times 10^6$ |

*Example V*

The process of Example IV, above, was repeated, employing an equimolecular proportion of ethyl acetoacetate in place of the ethylenediamine.

*Example VI*

The process of Example IV, above, was repeated, employing an equimolecular proportion of 1-amino-2-ethanol in place of the ethylenediamine.

*Example VII*

This example demonstrates the preparation of a resole phenol-formaldehyde resin for use in accordance with the present invention.

About 94 grams (1 mole) of phenol, 101.8 grams (1.25 moles) of formaldehyde (in the form of a 37% by weight formalin solution) and 12 grams of concentrated ammonium hydroxide were charged into a reaction vessel and heated to reflux (202° F.) in a period of 30 minutes. The heating of the reaction mixture at reflux was continued for 45 minutes. The reaction mixture was cooled, dehydrated under vacuum, until the batch temperature reached 167° F. at 1–2 centimeters of mercury pressure. The resole resin yield was 208 grams. The viscosity of the resole resin at 77° F. was 150–175 centipoises. A laminating varnish was prepared by dissolving the phenol-formaldehyde resole resin in 112 grams of ethanol to provide a solution having a solids content of 65%. This phenol-formaldehyde solution was then employed in preparing a reinforced zirconium modified resin laminate in accordance with the procedure described in Examples I and II, above.

As will be apparent to those skilled in the art, the phenol-formaldehyde resole resins employed in the foregoing examples may be replaced by resole resins resulting from the use of phloroglucinol, resorcinol, orcinol, metacresol, etc., instead of phenol per se. The formaldehyde may be replaced by furfuryl aldehyde, acetaldehyde or propionaldehyde, etc. The zirconium tetrabutoxide may be replaced with zirconium tetramethoxide, zirconium tetraethoxide, zirconium tetrapropoxide, zirconium tetrapentoxide, or zirconium tetrahexoxide, etc. The acetylacetone ethylenediamine, ethyl acetoacetate, 1-amino-2-ethanol in the foregoing examples may be replaced with propylenediamine, 1-amino-2-hydroxypropane, oxalic acid, etc.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A resinous composition having excellent strength characteristics, particularly at elevated temperatures, comprising the condensation product of a phenolic-aldehyde resole resin with a zirconium alkoxide, said phenol being a mononuclear phenol unsubstituted in a position para and at least one position ortho to a hydroxyl group, said aldehyde containing up to 6 carbon atoms.

2. A resinous composition as defined by claim 1 wherein the zirconium alkoxide is a zirconium tetraalkoxide with each alkoxide group containing from 1 to 6 carbon atoms.

3. A resinous composition as defined by claim 1 wherein the zirconium alkoxide is employed in an amount of between about 1% and 15% by weight of the total phenolic-aldehyde resole resin solids.

4. A resinous composition as defined by claim 3 wherein the zirconium alkoxide is employed in an amount of between about 5% and 15% by weight of the total phenolic-aldehyde resole resin solids.

5. A resinous composition as defined by claim 1 wherein the resole resin is produced by the condensation of phenol and formaldehyde.

6. A resinous composition as defined by claim 1 wherein the condensation mixture additionally contains a polyfunctional chelating agent capable of inhibiting the condensation between the resole resin and the zirconium alkoxide.

7. A resinous composition as defined by claim 2 wherein the zirconium alkoxide is zirconium tetrabutoxide.

8. A resinous composition as defined by claim 6 wherein the polyfunctional chelating agent is acetylacetone.

9. A reinforced laminate containing a resinous composition as defined by claim 1.

10. A reinforced laminate containing a resinous composition as defined by claim 2.

11. A process for producing a resinous composition having excellent strength characteristics, particularly at elevated temperatures, which comprises condensing a phenolic-aldehyde resole resin with a zirconium alkoxide in the presence of a polyfunctional chelating agent capable of inhibiting the condensation between the resole resin and the zirconium alkoxide, and finally curing the resulting zirconium-modified condensation product by heat with the concomitant deactivation of the excess polyfunctional chelating agent.

12. A process of producing a reinforced resinous laminate having excellent strength characteristics, particularly at elevated temperatures, which comprises impregnating plies of a web reinforcing structure with a mixture of a phenolic-aldehyde resole resin and a zirconium alkoxide having present a polyfunctional chelating agent capable of inhibiting the condensation between the resole resin and the zirconium alkoxide, precuring the plies and finally curing the laminate at an elevated temperature under conditions which remove the polyfunctional chelating agent from the final product.

References Cited in the file of this patent

UNITED STATES PATENTS

| | | |
|---|---|---|
| 2,543,137 | Uber | Feb. 27, 1951 |
| 2,581,605 | Scholl | Jan. 8, 1952 |
| 2,635,066 | Meiler | Apr. 14, 1953 |
| 2,702,758 | Uhlig et al. | Feb. 22, 1955 |
| 2,736,718 | Webber | Feb. 28, 1956 |
| 2,742,449 | Schlenker | Apr. 17, 1956 |

FOREIGN PATENTS

| | | |
|---|---|---|
| 413,328 | Great Britain | July 13, 1934 |
| 657,551 | Great Britain | Sept. 19, 1951 |